United States Patent
Kaneko et al.

(10) Patent No.: US 9,807,170 B2
(45) Date of Patent: Oct. 31, 2017

(54) STORAGE MANAGEMENT CALCULATOR, AND STORAGE MANAGEMENT METHOD

(71) Applicant: Hitachi, Ltd., Tokyo (JP)

(72) Inventors: Satoshi Kaneko, Tokyo (JP); Yukinori Sakashita, Tokyo (JP); Tsukasa Shibayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 267 days.

(21) Appl. No.: 14/766,212

(22) PCT Filed: Jun. 14, 2013

(86) PCT No.: PCT/JP2013/066419
§ 371 (c)(1),
(2) Date: Aug. 6, 2015

(87) PCT Pub. No.: WO2014/199506
PCT Pub. Date: Dec. 18, 2014

(65) Prior Publication Data
US 2015/0373119 A1 Dec. 24, 2015

(51) Int. Cl.
*H04L 29/08* (2006.01)
*G06F 9/50* (2006.01)
*G06F 3/06* (2006.01)
*G06F 12/00* (2006.01)
*G06F 13/10* (2006.01)
*G06F 11/20* (2006.01)
(Continued)

(52) U.S. Cl.
CPC ............ *H04L 67/1097* (2013.01); *G06F 3/06* (2013.01); *G06F 3/067* (2013.01); *G06F 3/0614* (2013.01);
(Continued)

(58) Field of Classification Search
CPC . H04L 67/1097; H04L 67/16; H04L 47/6205; G06F 3/06; G06F 3/067;
(Continued)

(56) References Cited

U.S. PATENT DOCUMENTS

| 8,381,217 B1* | 2/2013 | Wijayaratne | G06F 9/50 709/223 |
| 8,799,609 B1* | 8/2014 | Bauer | G06F 12/023 711/170 |

(Continued)

OTHER PUBLICATIONS

What's New in VMware vSphere 5.1—Storage, Technical Marketing Documentation V 1.02 / Updated Nov. 2014, http:/www.vmware.com/files/pdf/techpaper/Whats-New-VMware-vSphere-50-Storage-Technical-Whitepaper.pdf.
(Continued)

*Primary Examiner* — Le H Luu
(74) *Attorney, Agent, or Firm* — Mattingly & Malur, PC

(57) ABSTRACT

In one mode, a management calculator is connected to a host calculator and a storage device, and stores, in a memory, composition information and function setting information. The composition information shows multiple logic storage regions provided by the storage device, and objects that are stored in one logic storage region from among the multiple logic storage regions and that are executed by the host calculator, the logic storage regions and the objects being shown in association with one another. Meanwhile, the function setting information shows storage functions set for the logic storage regions.

11 Claims, 13 Drawing Sheets

(52) U.S. Cl.
CPC .............. *G06F 3/0631* (2013.01); *G06F 9/50* (2013.01); *G06F 9/5027* (2013.01); *G06F 9/5044* (2013.01); *G06F 9/5055* (2013.01); *G06F 11/20* (2013.01); *G06F 12/00* (2013.01); *G06F 13/10* (2013.01); *H04L 67/16* (2013.01)

(58) Field of Classification Search
CPC .... G06F 3/0614; G06F 3/0631; G06F 3/0605; G06F 3/0607; G06F 3/0608; G06F 3/061; G06F 3/0622; G06F 9/50; G06F 9/5027; G06F 9/5044; G06F 9/5055; G06F 11/20
See application file for complete search history.

(56) References Cited

U.S. PATENT DOCUMENTS

| | | | | |
|---|---|---|---|---|
| 9,239,680 | B2 * | 1/2016 | Eguchi | ................ G06F 3/0605 |
| 2008/0201544 | A1 * | 8/2008 | Nakajima | ............... G06F 3/061 |
| | | | | 711/166 |
| 2009/0144393 | A1 | 6/2009 | Kudo | |
| 2009/0157768 | A1 | 6/2009 | Ichikawa et al. | |
| 2009/0248953 | A1 * | 10/2009 | Satoyama | ............. G06F 3/0607 |
| | | | | 711/100 |
| 2010/0058021 | A1 * | 3/2010 | Kawamura | ........... G06F 3/0608 |
| | | | | 711/171 |
| 2010/0146207 | A1 * | 6/2010 | Kakui | ................... G06F 3/0608 |
| | | | | 711/114 |
| 2011/0078405 | A1 * | 3/2011 | Asano | ................... G06F 3/0607 |
| | | | | 711/170 |
| 2012/0304189 | A1 * | 11/2012 | Tominaga | ............. G06F 3/0622 |
| | | | | 718/104 |
| 2013/0151646 | A1 * | 6/2013 | Chidambaram | .... H04L 47/6205 |
| | | | | 709/213 |
| 2015/0363422 | A1 * | 12/2015 | Shibayama | ........... G06F 3/0605 |
| | | | | 707/827 |

OTHER PUBLICATIONS

International Search Report of PCT/JP2013/066419.

* cited by examiner

FIG.5

| EVENT ID | EVENT TYPE | VM ID | EVENT DESCRIPTION | TIME OCCURRED |
|---|---|---|---|---|
| 1 | DATA MIGRATION | VM5 | MIGRATE FROM Storage001 Vol005 to Storage001 Vol008 | 2013-3-10 08:00:00 |
| 2 | DATA MIGRATION | VM15 | MIGRATE FROM Storage001 Vol011 to Strage001 Vol012 | 2013-3-10 09:00:00 |
| 3 | HOST MIGRATION | VM20 | MIGRATE FROM HV001 TO HV002 | 2013-3-10 11:00:00 |
| 4 | ADD CPU | VM40 | ADD CPU10 | 2013-3-10 15:00:00 |
| ... | ... | ... | ... | ... |

| Storage ID | Port ID | HIGH LOAD DECISION CRITERIA Write DATA TRANSFER QUANTITY (MB/s) |
|---|---|---|
| 001 | 001 | 300 |
|  | 002 | 300 |
|  | 003 | 500 |

| Storage ID | RESOURCE TYPE | Write rate (MB/s) |
|---|---|---|
| 001 | SATA | 70 |
|  | SAS | 500 |
|  | SSD | 1000 |

| HV ID (2761) | VM ID (2762) | Storage ID (2767) | Storage Port ID (2768) | Vol ID (2769) | LBA (2770) | WRITE DATA QUANTITY (2771) | FINAL REFRESH TIME (2772) |
|---|---|---|---|---|---|---|---|
| 001 | 001 | 001 | 001 | 001 | 0-1500, 3000-6000 | 10MB/s | 2013-3-9 08:00:00 |
|  | 002 | 001 | 002 | 002 | 3000-4500, 11000-12000 | 5MB/s | 2013-3-9 08:00:00 |
|  | 003 | 001 | 002 | 002 | 5000-5500, 20000-26000 | 20MB/s | 2013-3-9 08:00:00 |
| ... | ... | ... | ... | ... | ... | ... | ... |
| 002 | null | 001 | 001 | 003 | null | 0MB/s | 2013-3-9 08:10:00 |
| 003 | 005 | 001 | 001 | 005 | 0-30000 | 80MB/s | 2013-3-9 08:30:00 |
| ... | ... | ... | ... | ... | ... | ... | ... |

| Storage ID (2807) | Vol ID (2801) | PAGE ID (2802) | LBA (2803) | POOL ID (2804) | RESOURCE ID (2805) | LBA (2806) |
|---|---|---|---|---|---|---|
| 001 | 001 | 1 | 0-999 | 1 | 0 | 1000-1999 |
|  |  | 2 | 1000-1999 |  | 1 | 0-999 |
|  |  | 3 | 2000-2999 |  | 2 | 0-999 |
|  |  | 4 | 3000-3999 |  | 2 | 1000-1999 |
|  |  | null | 4000-199999 |  | null | null |
|  |  | ... | ... | ... | ... | ... |
| ... | ... | ... | ... | ... | ... | ... |

2800

| Storage ID | POOL ID | RESOURCE ID | RESOURCE TYPE | RESOURCE CONFIGURATION |
|---|---|---|---|---|
| 001 | 0 | 10 | FC | INTERNAL |
| | 1 | 1 | FC | INTERNAL |
| | | 2 | SSD | INTERNAL |
| | | 3 | FC | EXTERNAL |
| | 2 | 4 | SATA | EXTERNAL |
| ... | ... | ... | ... | ... |

| | 2951 | 2952 | 2953 | 2954 | 2955 | 2956 |
|---|---|---|---|---|---|---|
| | Storage ID | RESOURCE ID | PORT ID | EXTERNAL Storage ID | EXTERNAL Storage RESOURCE ID | EXTERNAL Storage PORT ID |
| | 001 | 3 | 005 | 002 | 0 | 007 |
| | | 4 | 006 | 002 | 1 | 008 |
| | ... | ... | ... | ... | ... | ... |

FIG.13

| 2961 | 2962 | 2963 | 2964 | 2965 | 2966 | 2967 | 2968 | 29600 | 2969 |
|---|---|---|---|---|---|---|---|---|---|
| ID | P-Storage ID | PVOL ID | P-Pool ID | COPY TYPE | S-Storage ID | SVOL ID | S-Pool ID | COPY CHANNEL BAND | RPO |
| 1 | 001 | 005 | 10 | ASYN-CHRONOUS REMOTE | 003 | 010 | 10 | 500 Mbps | 300 sec |
| 2 | 001 | 022 | null | SYN-CHRONOUS LOCAL | 001 | 033 | null | null | null |
| 2 | 004 | 001 | null | Snapshot | 004 | 005 | 5 | null | null |

| 2971 | 2972 | 2974 |
|---|---|---|
| RELATED EVENT ID | TARGET RESOURCE ID | POST-EVENT WRITE DATA QUANTITY |
| 3 | VM20 | 50MB/s |
| 4 | VM40 | 80MB/s |
| ... | ... | ... |

| | 2981 | 2982 | 2983 | 2984 | 2985 |
|---|---|---|---|---|---|
| ID | TARGET Storage ID | TARGET VolID | SETTING TYPE | APPLIED CONDITION | |
| 1 | 001 | VOL005 | ASYNCHRONOUS REMOTE COPY | WRITE DATA QUANTITY < 1000MB PER SECOND | |
| 2 | 001 | VOL010 | SYNCHRONOUS LOCAL COPY | null | |
| 3 | 002 | VOL020 | WORM | null | |
| 4 | 002 | VOL030 | Encryption | null | |
| 5 | 002 | VOL040 | Snapshot | null | |
| 6 | ... | ... | ... | ... | |

WARNING: ENCRYPTION SETTINGS APPLIED TO VM50 WERE
CANCELED DUE TO DATA MIGRATION IN VM50

FIG.18

WARNING: PREDICTION VALUES FOR RPO OF THE VM60, VM70,
AND VM80 WERE CHANGED FROM 300 sec TO 350 sec
DUE TO CPU ALLOCATION FOR VM60

STORAGE MANAGEMENT CALCULATOR, AND STORAGE MANAGEMENT METHOD

TECHNICAL FIELD

The present invention relates to management technology for a storage system in a server virtualized environment.

BACKGROUND ART

Technology is appearing that achieves load balancing between data stores by migrating virtual host computers (Virtual Machines, hereafter called "VM") stored in storage areas on a physical host computer and executed on host computers, based on the I/O (Input/Output) load of the data store and the available storage capacity (nonpatent literature 1).

Patent literature 1 discloses a technology to select a data center as a potential destination capable of executing an application in conformance with the current performance status when migration of the application is required. In the patent literature 1, the VM selects a VM movement destination with a configuration capable of maintaining the relevant information as performance conditions by managing configuration information for the CPU (Central Processing Unit) of the server computer and the memory, and performance information on the I/O response time of the logical volume of the storage device.

CITATION LIST

Patent Literature

Patent literature 1: US Patent Application Publication No. 2009-0144393
Patent literature 2: US Patent Application Publication No. 2009-0157768

Nonpatent Literature

Nonpatent Literature 1: http:/www.vmware.com/files/pdf/techpaper/Whats-New-VMware-vSphere-50-Storage-Technical-Whitepaper.pdf

SUMMARY OF INVENTION

Technical Problem

In patent literature 1, a single management computer manages the configuration information for computer resources on the host computer, and performance information for the logical volume of the storage device, and selects an object movement destination capable of maintaining VM performance. However, no consideration is given to the storage function set in the logical volume for the case where the resource allocation is changed.

When management by the host computer is independent of the storage device, the computer managing the host computer might not always contain information settings for a storage function. For example in nonpatent literature 1, during load balancing, the host management computer sets the logical volume to serve as the movement destination for VM data by utilizing the I/O response performance value of the VM. However performance setting information cannot be found in the host management computer, even for example if a specified storage function was set in the logical volume storing the relevant VM data, so a change in the resource allocation might possibly then be instructed that affects performance settings relating to the relevant VM, and that change in resource allocation might not be detected.

The disclosed technology therefore had the problem that when a change in resource allocation to an object was made without taking the storage function settings into account, an effect was rendered on the storage function settings relating to the object that might possibly cause a drop in the performance or reliability of the system.

Means for Solving the Problem

To resolve the aforementioned problems, the management computer provided by the present invention is connected to a host computer and a storage device, and stores configuration information showing plural logical storage areas provided by the storage device linked to an object stored in one logical storage area among the plurality of logical storage areas and executed by the host computer, and function setting information showing storage functions set in the plural logical storage areas in the memory. The host computer detects a change in the resource allocation to the first object, and the management computer checks the configuration information and function setting information, acquires setting information for storage functions to the first logical storage area allocated to the first object prior to the change in resource allocation, decides whether or not an effect has occurred in the providing of a storage function relating to the first object due to the change in resource allocation, and outputs the decision results.

Advantageous Effects of Invention

The present invention is capable of improving system reliability and performance in environments in which the host computer has changed the resource allocation to the object.

BRIEF DESCRIPTION OF DRAWINGS

FIG. 5 is a drawing showing the VM event table of the first embodiment;
FIG. 6 is a drawing showing the storage port catalog performance table of the first embodiment;
FIG. 7 is a drawing showing the storage media catalog performance table of the first embodiment;
FIG. 8 is a drawing showing the VM data configuration information table of the first embodiment;
FIG. 9 is a drawing showing the volume physical logical storage area matching table of the first embodiment;
FIG. 12 is a drawing showing the external storage configuration information table of the first embodiment;

FIG. 13 is a drawing showing the storage copy configuration information table of the first embodiment;

FIG. 14 is a drawing showing the event effect table of the first embodiment;

FIG. 15 is a drawing showing the storage setting apply state table of the first embodiment;

FIG. 17 is a drawing showing an example of a GUI of the first embodiment;

FIG. 18 is a drawing showing an example of a GUI of the first embodiment;

DESCRIPTION OF EMBODIMENTS

Figure 1:
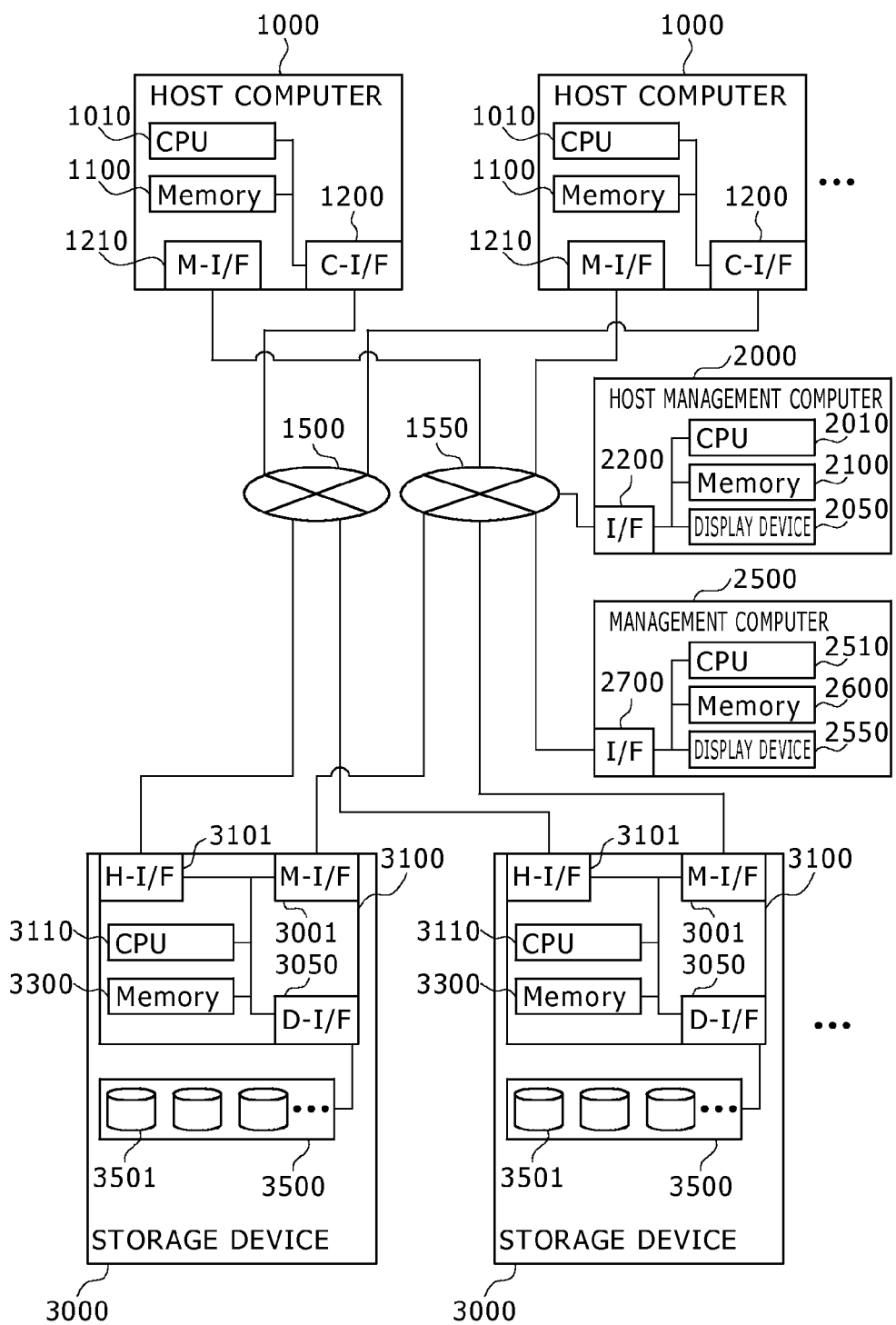
FIG. 1 is a structural view of the entire computer system of the first embodiment.

In the following description, the information for the embodiments is described by expressions such as "aaa table", etc. However this information may also be expressed by other than data structures such as tables. Therefore, expressions such as "aaa table" may be called "aaa information" to show there is no dependence on the data structure.

The expressions "identification information", "identifier", and "ID" are also utilized when describing the information content however these expressions are mutually interchangeable.

In the following description, explanations are sometimes given with "program" as the subject of the sentence. However, in the program, an established process is executed by a processor while utilizing a memory and communications port (communication control device) so that the description may also use "processor" as the subject of the sentence. The process disclosed with the program as the sentence subject may also be a process performed by an information processing device or computer such as a management server, etc. All or a portion of the program may also be implemented by dedicated hardware.

Each type of program may be installed in each computer by a program distribution server or by a storage media capable of being loaded by a computer.

Each computer contains input/output devices. Displays, keyboards, and pointer devices can be considered examples of input/output device but devices other than these may also be utilized. Moreover, serial interfaces or Ethernet interfaces may be utilized as input/output devices for the substitution of input/output devices, and display usage computers containing displays, keyboards, or pointer devices may be connected to the relevant interface, and by sending the display information to the display usage computer and receiving the input information from the display usage computer, the showing of displays and receiving inputs by the display usage computer may be substituted for displays and entries by an input/output device.

First Embodiment

The first embodiment is described while referring to the drawings.

FIG. 1 is a structural view of the entire computer system of the first embodiment. The computer system of the present embodiment includes host computers 1000 and storage devices 3000. The host computers 1000 and the storage devices 3000 are connected by way of a data network 1500. This computer system further includes a host management computer 2000, and a management computer 2500. The host computers 1000, the host management computer 2000, the management computer 2500, and storage devices 3000 are connected by way of a management network 1550.

The data network 1500 is for example a SAN (Storage Area Network) however an IP (Internet Protocol) network may be utilized and other data communication networks may also be utilized. The management network 1550 is for example an IP network but a data communication network such as SAN may be utilized. Moreover, the data network 1500 and management network 1550 may be the same network. The host computers 1000, the host management computer 2000, and the management computer 2500 may be the same computer.

The host computers 1000 include a control device such as a CPU (Central Processing Unit) 1010, a storage device such as a memory 1100, an M-I/F (Management-Interface) 1210, and a C-I/F (Communication-Interface) 1200. The host computers 1000 may also include an input/output device (keyboard, display device, etc.). The CPU 1010 executes programs stored within the memory 1100. Hereafter, components called CPU in all cases signify a component for summoning and executing a program stored within the memory connected to that CPU. The M-I/F 1210 is an interface with the management network 1550 and sends and receives data and control commands to and from each of the storage devices 3000, the host management computer 2000, and the management computer 2500. The C-I/F 1200 is an interface with the data network 1500 and sends and receives data and control commands to and from the storage devices 3000.

The host management computer 2000 includes a CPU 2010, a display device 2050 (display unit) such as a LCD (Liquid Crystal Display), a memory 2100, and an I/F 2200. The host management computer 2000 may include an input device (keyboard etc.). The I/F 2200 is an interface with the management network 1550, and sends and receives data and control commands to and from each of the storage devices 3000, the host computers 1000 and the management computer 2500.

A VM management program and a VM management table not shown in the drawing are stored in the memory 2100. The VM management program is a program to manage the configuration information of the VM 1001 described later on, and sends and receives various types of information by way of an I/F to and from the management computer 2500. The VM management table stores VM 1001 performance information and configuration information. Performance information for the VM 1001 is for example the periodically measured response time and the write data quantity (MB per second) onto the storage area per unit of time. The VM/storage information acquisition program for the management computer 2500 described later on acquires various types of information from the VM management table by way of the I/F.

The management computer 2500 includes a CPU 2510, a display device 2550 (display unit) such as an LCD, etc., a memory 2600, and an IF 2700. The management computer 2500 may also include an input device (keyboard, etc.). The I/F 2700 is an interface with the management network 1550, and sends and receives data and control commands to and from each of the storage devices 3000, the host computers 1000, and the host management computer 2000. The programs stored in the memory 2600 are described in detail later on.

The storage device 3000 includes a disk controller 3100 and disk device 3500. The disk controller 3100 includes a CPU 3110, a memory 3300, an M-I/F 3001, an H-I/F (Host-Interface) 3101 serving as a storage port, and a D-I/F (Disk-Interface) 3050. The M-I/F 3001 is an interface with the management network 1550, and sends and receives data and control commands to and from each of the host computers 1000, host management computer 2000, and the management computer 2500. The H-I/F 3101 is an interface with the data network 1500, and sends and receives data and control commands to and from the host computers 1000. The D-I/F 3050 sends and receives data and control commands to and from the disk device 3500. The disk device 3500 includes plural physical storage media 3501.

Storage configuration management programs, storage performance management programs, storage setting programs, and storage configuration and performance tables not shown in the drawing are stored in the memory 3300.

The storage configuration management program is a program to manage configuration information for the storage device 3000, and sends and receives various types of information by communicating with the VM/storage information acquisition program 2610 of the management computer 2500 related later on. The storage performance management program is a program to manage the performance information of the storage device 3000. Performance information for the storage device 3000 is for example the periodically measured IOPS (Input Output Per Second) per page and the write data quantity (MB per second) onto the storage area. The storage performance management program sends and receives various types of information by communicating with the VM/storage information acquisition program 2610 of the management computer 2500 described later on.

The storage setting program is a program to execute each type of setting of the storage device 3000. In the present embodiment, the various settings for the storage device 3000 include settings for obtaining cache areas for temporarily storing read/write data, on the logical volume 3510 and physical resource 3521; setting such as for obtaining a processor to execute read/write processing, on the logical volume 3510; and settings for improving access performance to the host computer 1000. Each program stores management information in storage configurations and performance tables.

The number of computers is not limited to this configuration. In the present embodiment, the host management computer 2000 is configured to manage the host computer 1000 however the described processing by the host management computer 2000 may also be executed by the host computer 1000, and in the subsequent description the host management computer 2000 may be substituted for the host computer 1000. The data network 1500 may also include switches such as FC (Fibre Channel) switches, and the relevant switch may send and receive data and control commands between the respective C-I/F 1200 of the host computer 1000 and D-I/F 3050 of the storage device 3000.

Figure 2:
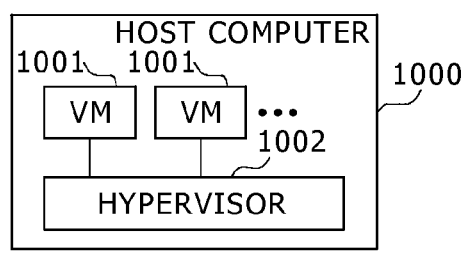
FIG. 2 is a drawing showing the logical configuration of the host computer of the first embodiment.

FIG. 2 is a drawing showing the logical configuration of the host computer 1000. The host computer 1000 contains a hypervisor (Hypervisor: hereafter called "HV") 1002 capable of logically generating the VM 1001 and executing the VM 1001. The HV 1002 can control the plurality of VM 1001 at one time. Each of the plural VM 1001 is capable of executing an application as if executed on a standalone physical computer.

The host management computer 2000 or the host computer 1000 executes a resource allocation command from the VM 1001 by utilizing the technology disclosed for example in the nonpatent literature 1. Resource allocation changes in the storage device 3000 such as the logical volume are set based on the I/O quantity and logical volume capacity, and instructions are given to the management computer 2500 or storage device 3000. Alternatively, the resource allocation changes of the host computer 1000 are instructed to the host computer 1000 based on the VM 1001 performance information. The resource allocation changes of the host computer 1000 include for example additions of CPU allocated to the VM 1001, or a VM migration (movement) to the another host computer 1000.

Figure 3:
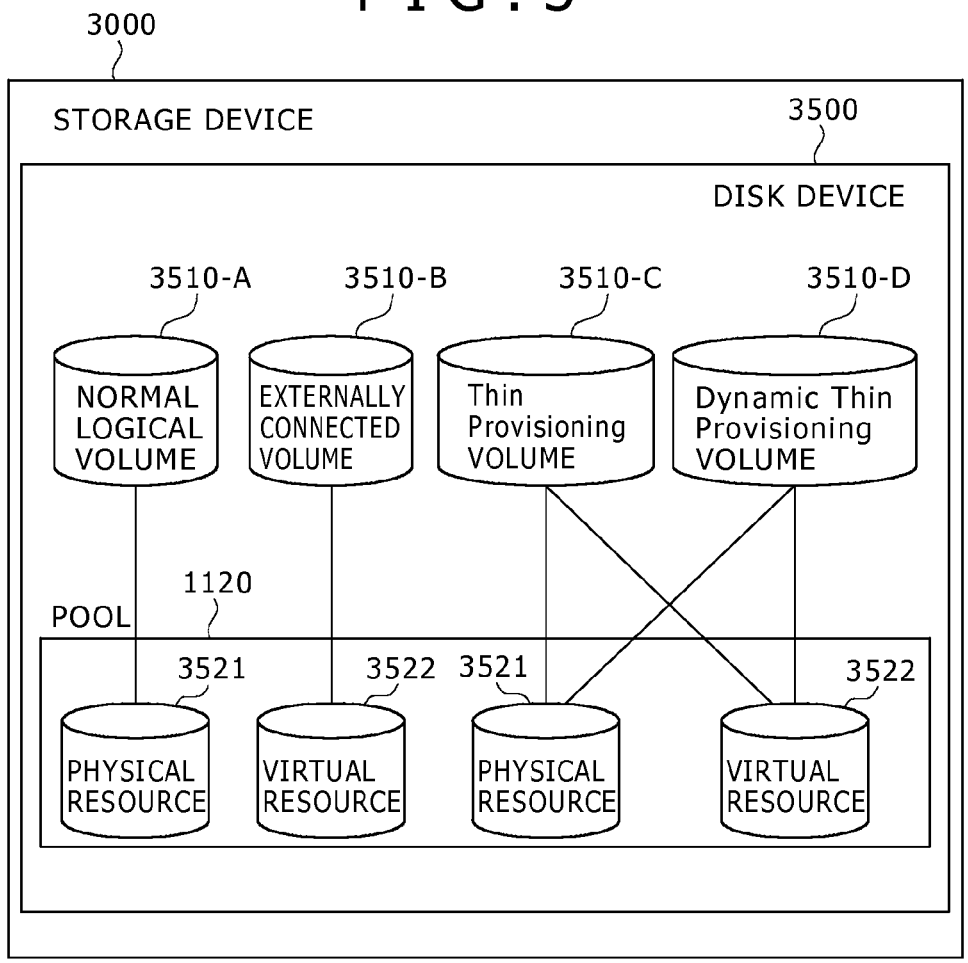
FIG. 3 is a drawing showing the structure of the disk device of the first embodiment.

FIG. 3 is a descriptive diagram showing the structure of the logical volume 3510 generated by utilizing the storage device 3000. The storage device 3000 generates a logical volume 3510 by utilizing the plural physical storage medium 3501 within the disk device 3500. The storage device 3000 may also generate plural logical volumes 3510. The plurality of logical volumes 3510 may be of the same type or may different types.

The pool 1120 includes one or more physical resources 3521 or one or more virtual resources 3522. In the present embodiment, the physical resource 3521 is defined as a logical device on a RAID (Redundant Array of Independent Disks) configured by utilizing plural physical storage medium 3501. Moreover, on a single storage device 3000, a virtual resource 3522 is defined as logical device fabricated within an external storage device (externally connected storage system) serving as a separate storage device connected to that storage device 3000. Seen from a management perspective, the pool 1120 is a group of logical devices for collectively managing the physical resource 3521 or the virtual resource 3522. Also seen from a managing perspective, the pool 1120 is for example the RAID type. In FIG. 3, the physical resource 3521 and the virtual resource 3522 are mixed within the pool 1120, however a pool 1120 may utilize only physical resources 3521, or a pool 1120 may utilize only the virtual resources 3522. Plural physical storage medium 3501 may for example include HDD such as SATA (Serial Advanced Technology Attachment) or SAS (serial attached SCSI: small computer system interface), or SSD (Solid State Drive), etc. Plural media types having mutually different performance may each be allocated to the plural physical resources 3521 and virtual resources 3522. The storage device 3000 may include plural pools 1120.

The normal logical volume 3510A is a logical volume generated by utilizing the physical resource 3521 using the physical storage media 3501. The externally connected volume 3510B is a logical volume generated by utilizing the virtual resource 3522 and an actual storage area is located in an external storage device. The Thin Provisioning volume 3510C is a logical volume whose capacity is dynamically expandable. Thin Provisioning is a technology for efficient usage of storage areas by allocating a portion of a physical storage area (hereafter called a segment), to allow dynamically expanding the storage area. The physical resource 3521 or the virtual resource 3522 provides segments for allocation to the Thin Provisioning volume 3510C. The capacity of the Thin Provisioning volume 3510C is dynamically expanded by allocating segments from the physical resource 3521 or the virtual resource 3522 contained in the pool 1120 to the Thin Provisioning volume 3510C at the point in time that the I/O are received from the host computer 1000.

The Dynamic Thin Provisioning volume 3510D is a logical volume whose capacity is capable of being dynamically expanded the same as the Thin Provisioning volume 3510C. Further, after a segment has been allocated to the Dynamic Thin Provisioning volume 3510D, that segment can be dynamically changed to another segment having different responsiveness and reliability, according to the access status to the Dynamic Thin Provisioning volume 3510D.

In the above description in FIG. 3, the Thin Provisioning volume 3510C and Dynamic Thin Provisioning volume 3510D are allocated segments from both the physical resource 3521 and the virtual resource 3522, however segments may be allocated from any or either of these resources.

Figure 4:
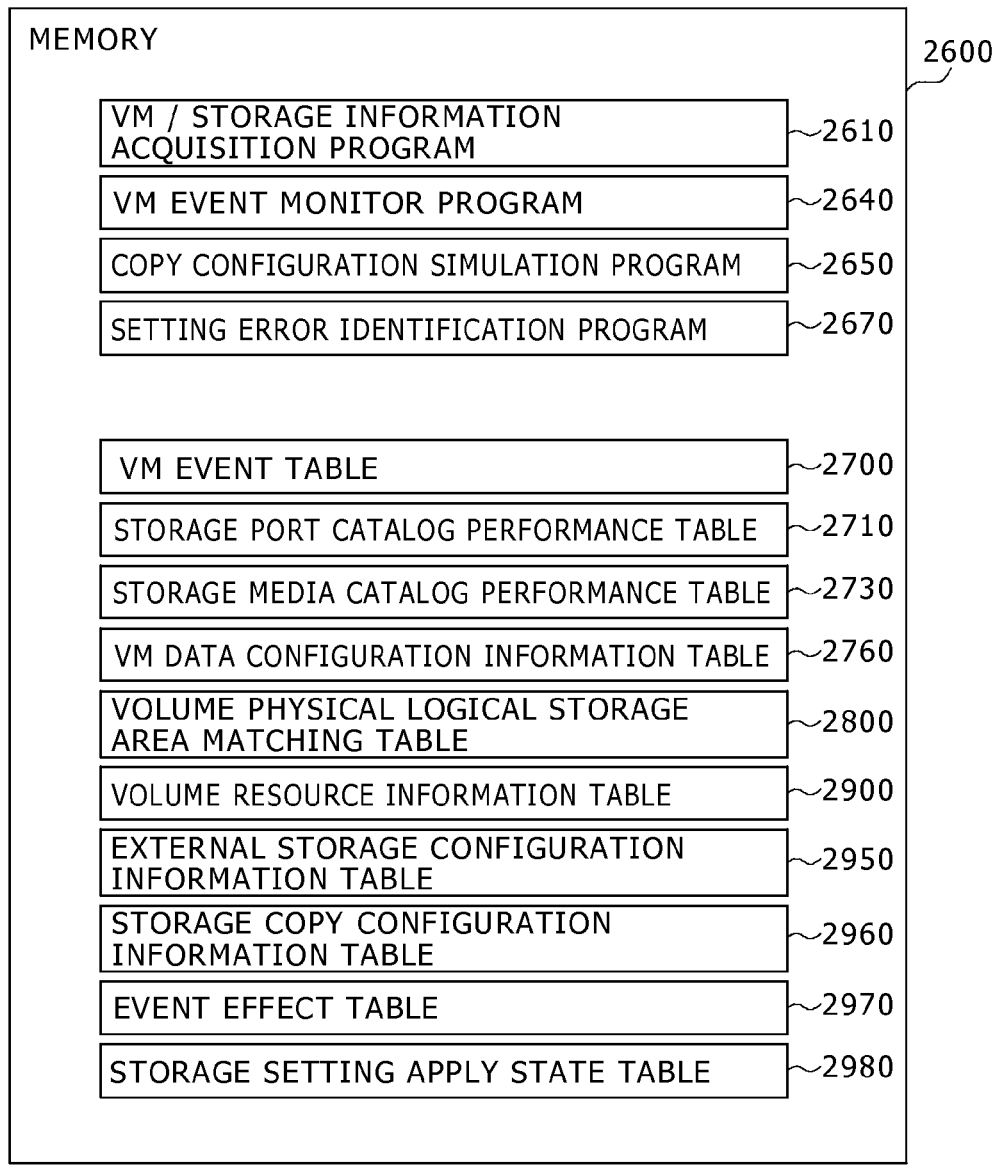
FIG. 4 is a drawing showing the internal structure of the memory for the management computer of the first embodiment.

FIG. 4 is a drawing showing the structure of the information stored in the memory 2600 of the management computer 2500. The memory 2600 stores programs including a VM/storage information acquisition program 2610, a VM event monitor program 2640, a copy configuration simulation program 2650, and a setting error identification program 2670. The memory 2600 further stores information tables including a VM event table 2700, a storage port catalog performance table 2710, a storage media catalog performance table 2730, a VM data configuration information table 2760, a volume physical logical storage area matching table 2800, a volume resource information table 2900, an external storage configuration information table 2950, a storage copy configuration information table 2960, an event effect table 2970, and a storage setting apply state table 2980.

FIG. 5 is a drawing showing the structure of the VM event table 2700. The VM event table 2700 is a table for managing the event information relating to the VM 1001, as instructed by the host management computer 2000. This table includes the event ID 2701 indicating the target event, the event type 2702 showing the type of the relevant event, the VMID 2703 showing the target VM, the event description 2704 showing the description of the target event, and the time occurred 2705 showing the time when the target event occurred. This table moreover specifies the corresponding relation among the information contained within it. The event type 2702 for example shows the event type signifying movement of VM data to an optional storage area as a type called a data migration. The event type 2702 for example shows the event type signifying an event moving the VM to an optional host computer 1000 as an event called a host migration. In the host migration, the computer resource such as the CPU or memory utilized by the relevant VM is changed, and there is no change before or after movement (or migration) in the storage area that the VM data stored.

The event description 2704 for example shows detailed information about the event including resource ID information for resources other than the VM relating to the relevant event. If the event type 2702 is for example a data migration, the configuration includes an identifier for the data storage logical volume of the VM movement resource and the VM movement destination so that detailed information for an event such as movement from the logical volume 001 to the logical volume 008 is stored in the event description 2704.

FIG. 6 is a drawing showing the structure of the storage port catalog performance table 2710. The storage port catalog performance table 2710 is a table for managing the catalog performance information of the H-I/F 3101 which serves as the storage port for the storage device 3000. This table moreover includes the storage ID 2711 of storage device 3000 containing the target storage port, the port ID 2712 showing the target storage port, and the high load decision criteria 2714 which is the write data transfer quantity at which the response time starts to become especially long due to an increase in the write data transfer quantity of the target storage port. Further, this table specifies corresponding relation among information included in that table. The high load decision criteria 2714 can for example utilize a value shown in the catalog or manual of the target storage device.

FIG. 7 is a drawing showing the structure of the storage media catalog performance table 2730. The storage media catalog performance table 2730 is a table for managing the catalog performance information for the resource medium comprising the logical volume 3510 of the storage device 3000. The resources comparing the logical volume 3510 are the physical resource 3521 or the virtual resource 3522. The storage media catalog performance table 2730 includes a storage ID 2731 showing the storage device 3000 containing the target resource, the resource type 2732 for the target resource, and the write rate 2734 which is the write speed (MB/s) of the target resource. Moreover, this table specifies the corresponding relation among the information contained in that table.

FIG. 8 is a drawing showing the structure of the VM data configuration information table 2760. The VM data configuration information table 2760 is a table for managing the link between the VM 1001, and the logical volume 3510 storing the actual data of that VM 1001. The VM data configuration information table 2760 contains an HV ID 2761 showing the HV 1002 holding the target VM 1001, a VM ID 2762 showing the target VM 1001, a storage ID 2767 showing the target storage device 3000 for storing the data of the target VM 1001, a storage port ID 2768 for showing the storage port of the target storage device 3000, a logical Vol ID 2769 showing the target logical volume 3510, an LBA information 2770 showing the range of the LBA (Logical Block Addressing) for the target logical volume 3510, a write data quantity 2771 showing the write data quantity that the target VM writes onto the target logical volume, and a final refresh time 2772 showing the time that the configuration information of the target VM was last rewritten.

This table further specified the corresponding relations among information contained within the table. Here, the entry that is null for the VM ID 2762 is where a logical volume 3510 is allocated to the host computer 1000 containing an HV1002, and indicates a state where that logical volume 3510 is not utilized in any of the VM 1001. The null entry for LBA 2770 is where a logical volume 3510 is allocated to the host computer 1000, and indicates a state where a page still has not been allocated to that logical volume 3510.

FIG. 9 is a drawing showing the structure of the volume physical logical storage area matching table 2800. The volume physical logical storage area matching table 2800 is a table for managing the corresponding relation between the LBA within the logical volume 3510 provided by the storage device 3000, and the LBA within the physical resource 3521 or virtual resource 3522. This table includes a storage ID 2807 showing the target storage device 3000, a logical Vol ID 2801 showing the target logical volume 3510, a page ID 2802 showing the target page of the target logical volume 3510, an LBA information 2803 showing the range of the LBA of the target page, a pool ID 2804 showing the pool 1120 where the resource utilized for the target page belongs, a resource ID 2805 showing the resource utilized for the target page, an LBA information 2806 showing the range of the LBA allocated to the target page for the target resource. The write data quantity for the storage area of the VM acquired from the host management computer 2000 is stored in the write data quantity 2771.

Figures 10, 11:
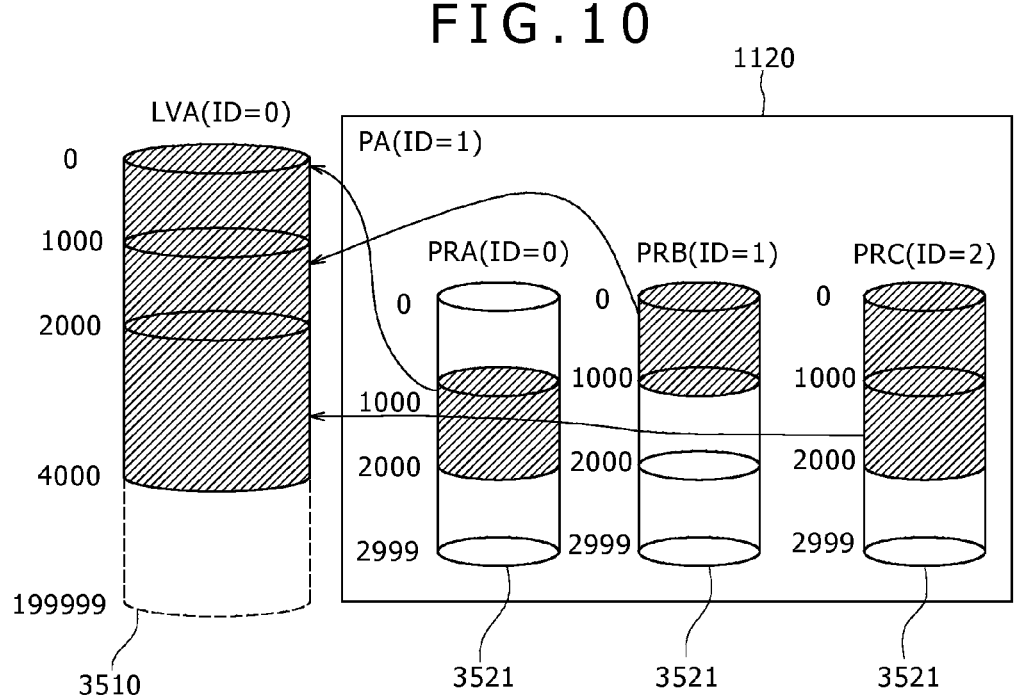
FIG. 10 is a drawing showing the status of the volume physical logical storage area matching table of the first embodiment.
FIG. 11 is a drawing showing the volume resource information table of the first embodiment.

FIG. 10 is a descriptive diagram showing the state of the pool 1120 and the logical volume 3510 managed by the volume physical logical storage area matching table 2800. In this example, a PRA serving as the physical resource 3521 where the resource ID 2805 is shown as "0", a PRB serving as the physical resource 3521 where the resource ID 2805 is shown as "1", and a PRC serving as the physical resource 3521 where the resource ID 2805 is shown as "2"; are created within the within the PA serving as the pool 1120 where the pool ID 2804 is shown as "1". An LVA is generated as the logical volume 3510 where the logical Vol ID 2801 is shown as "0". The PRA 1000 address to the 1999 address correspond to the LVA 0 address to 999 address. The PRB 0 address to 999 address correspond to the LVA 1000 address to 1999 address. The PRC 0 address to 1999 address correspond to the LVA 2000 address to 3999 address. None of the physical resources 3521 are allocated to the LVA 4000 address to 199999 address. The corresponding relation between the logical volume 3510 and the pool 1120 changes dynamically if using Dynamic Thin Provisioning volume 3510D in the logical volume 3510.

FIG. 11 is a drawing showing the structure of the volume resource information table 2900. The volume resource information table 2900 is a table for managing the information of the physical resource 3521 and the virtual resource 3522. This table includes a storage ID 2901 showing the target storage device 3000, a pool ID 2902 showing the pool 1120 where the target resource belongs to, a resource ID 2903 showing the target resource, a media type 2904 for the target resources such as SATA or SSD or FC (Fibre Channel), and a resource configuration 2905 showing the physical resource 3521 or the virtual resource 3522. This table moreover specifies the corresponding relation among the information contained within it. The resource configuration 2905 in the volume resource information table 2900 shows the physical resource 3521 serving as the resource in the internal section of the target storage device 3000 as "Internal", and shows the virtual resource 3522 serving as the resource within the external storage device connected to the target storage device 3000 as "External."

FIG. 12 is a drawing showing the structure of the external storage configuration information table 2950. The external storage configuration information table 2950 is a table for managing the structure (configuration) of the virtual resource 3522. This table moreover contains a storage ID 2951 showing the target storage device 3000, a resource ID 2952 showing the target virtual resource 3522, a port ID 2953 showing the H-I/F 3101 serving as the storage port utilized in the external connection for the target storage device 3000, an external storage ID 2954 showing the target external storage device, an external storage resource ID 2955 showing the physical resource 3521 within the target external storage device corresponding to the target virtual resource 3522, and an external storage port ID 2956 showing the H-I/F 3101 serving as the port utilized for external connection to the external storage device. This table moreover specifies the corresponding relation among the information contained within it.

FIG. 13 shows the structure (configuration) of the storage copy configuration information table 2960. The storage copy configuration information table 2960 is a table for managing the copy configuration of the storage device 3000. This table contains an ID 2961 showing the copy pairs, a P-storage ID 2962 showing the storage device on the main side of the target copy pair, a PVOL ID 2963 showing the logical volume for the main side of the target copy pair; and among the pools configuring the target copy pair contains the P-Pool ID 2964 showing the pools within the storage device on the main side, and the copy type 2965 showing the target copy type, and S-storage ID 2966 showing the storage device on the sub side of the target copy pair, and the SVOL ID 2967 showing the logical volume for the sub side of the target copy pair; and among the pools configuring the target copy pair contains an S-Pool ID 2968 showing the pool within the storage device on the sub side, and a copy channel band 29600 showing the band for the remote copy channel when the copy type for the target copy pair is asynchronous remote, and an RPO 2969 showing the target recovery point (hereafter called, RPO (Recovery Point Objective)) when the copy type for the target copy pair is asynchronous remote.

The RPO shows what target value can be utilized for the task of restarting by utilizing data (status) from a point in time as close as possible to the time the trouble occurred, in order to restore the computer system where the problem or disaster occurred to normal operation.

This table moreover specifies the corresponding relation among the information contained within it. The P-Pool ID 2964 is the same as the pool shown in the pool ID 2902 of the volume resource information table 2900, and the application differs according to the copy type 2965. When the copy type is asynchronous remote copy, the relevant pool is utilized as a buffer area to temporarily store the write data from the host computer 1000; and when the copy type is snapshot, the relevant pool is utilized as a journal data storage area. The S-Pool ID 2968 is the same as the pool shown in the pool ID 2902 of the volume resource information table 2900, and the application differs according to the copy type 2965. If the copy type is asynchronous remote copy, the relevant pool is utilized as a buffer area to temporarily store the write data from the host computer 1000 that was transferred from the storage device on the main side. The value of the copy channel band 29600 can be rewritten by the VM/storage information acquisition program 2610, and the user utilizes that entered value as information for the copy channel band for the management computer 2500 when making the relevant copy settings. The value of the RPO 2969 may be written by the VM/storage information acquisition program 2610 and after final acquisition of the storage configuration information, the VM/storage information acquisition program 2610 may specify configuration information for the target copy pair in the copy configuration simulation program 2650, command the calculation of the RPO, and utilize those calculation results.

FIG. 14 shows the structure (configuration) of the event effect table 2970. The event effect table 2970 is a table for managing the effect on the VM 1001 of the host management computer due to an event stored in the VM event table 2700. The effect on the VM 1001 for example is the result of an event such as the (unwanted) movement (or migration) of data to a logical volume not set with the same settings as the storage settings in the logical volume prior to movement, or that the RPO is an unfulfilled RPO, and so on and indicates conditions required by the VM 1001 from results of the event are not fulfilled.

This table moreover contains a related event ID 2971 showing the event which is the cause of the target effect, a target resource ID 2972 showing the target resource, and a post-event write data quantity 2974 showing the write data quantity after the target event. This table moreover specifies the corresponding relation among the information contained within it.

The post-event write data quantity 2974 is an index or marker for assessing the effect that the target resource received due to the event. In the case for example that there was an event on the host computer side as a host migration (movement) or addition of a CPU, the post-event write data quantity 2974 for example stores values acquired by the VM/storage information acquisition program 2610 of the management computer 2500 after the target event from the VM management table of the host management computer 2000. Also, if there was a data migration (movement), a value that the management computer 2500 checked in the event description 2704 of the VM event table 2700 and calculated may be utilized. An example of that calculation method is described later on.

FIG. 15 is a drawing showing the configuration of the storage setting apply state table 2980. The storage setting apply state table 2980 is a table for managing the setting information for the storage function applied to the logical volume 3510 of the storage device 3000. This table also contains the ID 2981 showing the identifier for the target storage setting, the target storage ID 2982 showing the storage device 3000 containing the management volume 3510 where the target storage settings are applied, the target Vol ID 2983 showing the target logical volume, the setting type 2984 showing the type of target storage setting, and the applied condition 2985 showing conditions for satisfying the goal of the target storage setting. The setting type 2984 also for example stores the values: "asynchronous remote copy" showing settings for asynchronous type remote copy or "synchronous local copy" showing a synchronous type local copy setting, or "WORM" showing that access rights for WORM (Write Once Read Many) were set in data within the target logical volume, or "Encryption" showing that data within the target logical volume was encrypted, or "Snapshot" showing settings executed for generating a snapshot in the target logical volume. When the setting type 2984 is asynchronous remote copy, a condition may be stored in the apply condition 2985 by utilizing a value from the host computer 1000 for a write data quantity onto the target logical volume, in order to implement a predefined RPO requirement for storage configurations already set in the target logical volume shown in the storage copy configuration information table 2960. Information in this table is for example set beforehand by the manager.

Before implementing the present embodiment, the storage function was set in the logical volume at the request made to the storage device manager from the manager of the host computer, or at the judgment of the storage device manager. The storage function was set and managed by using the prior technology of the management computer 2500. Alternatively, a function equivalent to local copy may be implemented by a function of the host management computer 2000.

The processing implemented by the management computer 2500 is described next in detail.

The processing by the VM/storage information acquisition program 2610 is first of all described. The VM/storage information acquisition program 2610 acquires configuration information and performance information for the VM 1001 from the host management computer 2000. The VM/storage information acquisition program 2610 also acquires configuration information and performance information about the storage device 3000 from the storage device 3000. The VM/storage information acquisition program 2610 links the configuration information acquired for each storage device 3000 with configuration information and performance information of each VM 1001, and stores it in the VM data configuration information table 2760.

The VM/storage information acquisition program 2610 also does processing for rewriting or storing the acquired configuration information, and so on in the volume physical logical storage area matching table 2800, the volume resource information table 2900, the external storage configuration information table 2950, the storage copy configuration information table 2960, and in the storage setting apply state table 2980. The VM/storage information acquisition program 2610 also stores the acquired storage performance information in the storage port catalog performance table 2710 and the storage media catalog performance table 2730. The VM/storage information acquisition program 2610 may periodically perform the above described processing, and may perform the processing on occasions when user operation was received via an input device.

The VM event monitor program 2640 acquires event information for the VM 1001 from the host management computer 2000, and stores the acquired event information in the VM event table 2700 and the event effect table 2970, and also notifies the setting error identification program 2670 of the acquired event information. When event information for the VM 1001 was acquired from the host management computer 2000, the VM event monitor program 2640 may also acquire performance information on the target VM 1001 of the relevant event from the VM management table of the host management computer 2000, and rewrite the post-event write data quantity of the event effect table 2970.

The copy configuration simulation program 2650 is a program to calculate the RPO from the configuration information for the specified copy pair, and calculate the required configuration for achieving the relevant RPO from the sectional configuration information of the specified copy pair and the RPO. The RPO calculation method as for example described in the patent literature 2, may also be a method for calculating the RPO from performance information of the storage medium configuring the relevant copy pair, performance information of the storage port, performance information of the remote copy channel band, capacity information of the buffer area, and the write data quantity by the VM 1001 based on: storage configuration information for other than the relevant acquired RPO, information for the storage port catalog performance table 2710, the storage media catalog performance table 2730, a VM data configuration information table 2760, a volume physical logical storage area matching table 2800, a volume resource information table 2900, and the external storage configuration information table 2950. The RPO may also be found from a method to calculate the copy configuration from the RPO as described in the aforementioned literature for those structures also requiring achievement of the RPO.

The processing by the setting error identification program 2670 is described next. The setting error identification program 2670 performs processing to acquire the event information that was notified from the VM event monitor program 2640 of the management computer 2500, and notify the VM 1001 of the effects on the storage settings of the VM 1001 due to the relevant event.

Figure 16:
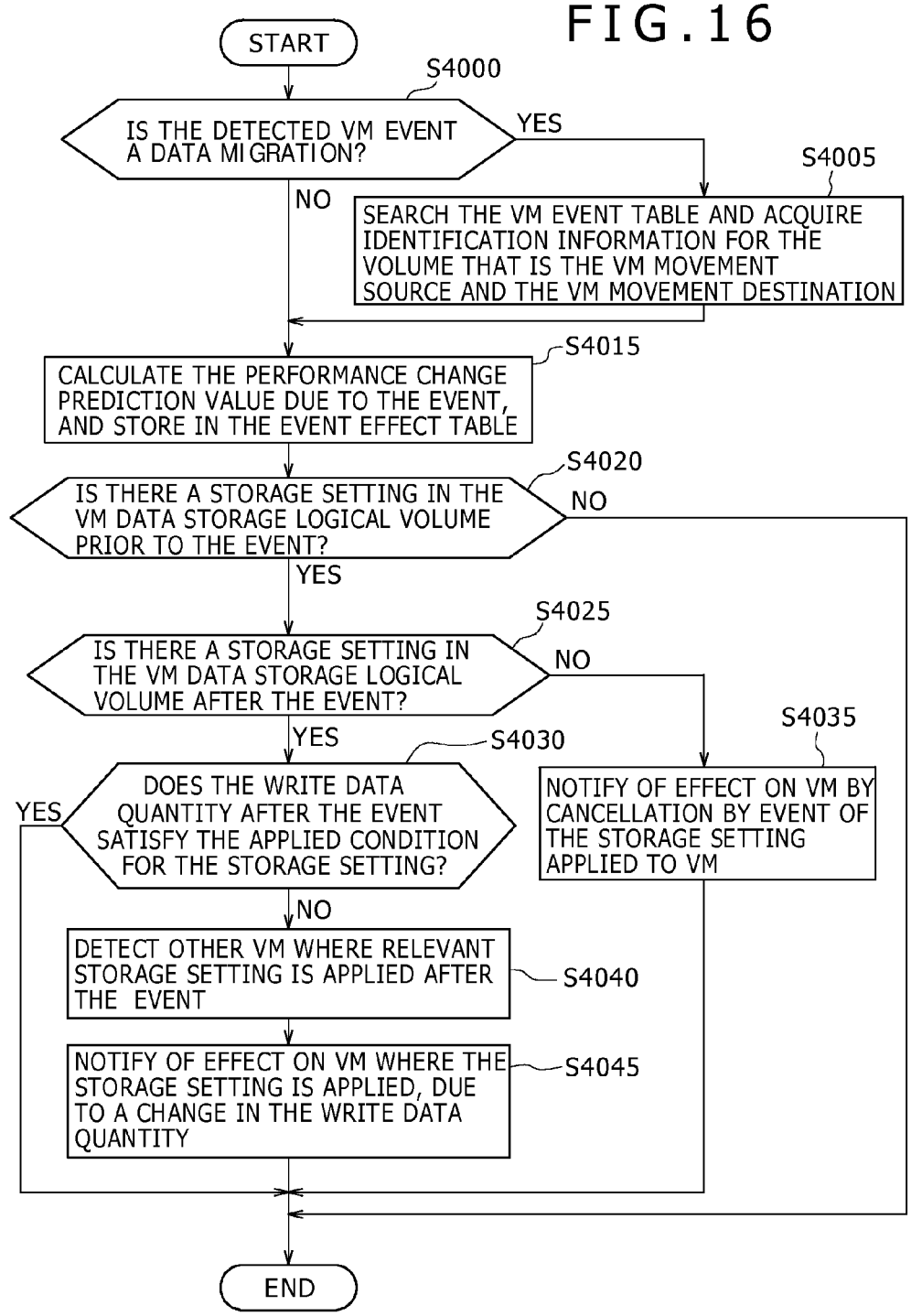
FIG. 16 is a flow chart showing the processing in the setting error identification program of the first embodiment.

FIG. 16 is a flowchart showing the processing by the setting error identification program 2670.

The setting error identification program 2670 first of all decides whether or not an event showing a data migration (movement) was notified from the VM event monitor program 2640 (S4000). If the result from the S4000 is Yes, then the setting error identification program 2670 checks the VM event table 2700 and acquires volume identification information for the VM movement source and VM movement destination (S4005).

The setting error identification program 2670 next calculates the performance change prediction value due to the relevant event from the VM event monitor program 2640 based on the acquired volume identification information, and stores it as the post-event write data quantity 2974, along with the related event ID 2971 and target resource ID 2972 in the event effect table 2970 (S4015).

First of all, a check is made of the volume physical logical storage area matching table 2800, and the volume resource information table 2900, and each resource and its type configuring the post-event data storage volume shown by the acquired identification information is specified. The setting error identification program 2670 next checks the Write rate 2734 of the storage media catalog performance table 2730 and calculates the expected write rate for the relevant volume. The expectation value for the write rate of the relevant volume for example is calculated by finding a value that is the percentage that the LBA quantity of the relevant resource occupies in the total LBA quantity of the relevant volume multiplied by the Write rate 2734 for the type of each resource configuring the volume, and adding the value to all resources configuring the volume.

Here, when the resource configuration 2905 for the relevant resource ID in the volume resource information table 2900 is "External", the external storage configuration information table 2950 is checked, and the external storage port ID 2956 for use is acquired. Next, the storage port catalog performance table 2710 is checked to acquire the high load decision criteria 2714 of the acquired storage port ID. The high load decision criteria and the write rate for the resource type of the relevant resource are compared, the smaller value is utilized, and a value found from multiplying the percentage that the LBA quantity of the relevant resource occupies in the total LBA quantity of the relevant volume by the utilized (smaller) value may be used to calculate the expectation value for the write rate of the volume.

Next, the VM data configuration information table 2760 and the storage port catalog performance table 2710 are checked, and a value for the high load decision criteria 2714 of the port utilized to access the relevant storage area from the host computer after movement (migration) is acquired. The expectation values for the above described write rate of the volume after movement is compared with the high load decision criteria 2714 and the smaller value may be utilized as the post-event write data quantity. The port and the catalog performance value for the resource are compared because the data write performance is affected by the performance value for resource with the lowest performance which acts as a bottleneck among the related resources.

Alternatively, the pre-event target VM write data quantity data may be compared with the above utilized port or volume performance value, and the smaller value may be stored as the post-event write data quantity. This method can be used because the write data quantity of the target VM can be utilized unchanged when the post-event volume or port performance expectation value is sufficiently high. The pre-event target VM write data quantity is acquired by checking the VM data configuration information table 2760 based on the volume identification information for the VM movement (migration) source acquired in S4005. If the Vol ID 2769 stored while linked to the ID 2762 is different from the identification information for the acquired volume, then a decision can be made that information prior to VM movement cannot be acquired since the VM data configuration information table 2760 was rewritten prior to performing this processing, the process stopped, and an error message output to a display device.

The step S4015 is also performed next if S4000 is a No. In this case, the VM/storage information acquisition program 2610 of the management computer 2500 acquired the target post-event write data quantity from the VM management table for the host management computer 2000, and that value is stored in the event effect table 2970.

Next, the setting error identification program 2670 checks the VM event table 2700 and the storage setting apply state table 2980, and decides whether or not the storage settings in the logical volume storing the VM data prior to the event were executed (S4020). If the result from S4020 is No, the processing is ended.

If the result from S4020 is Yes, the setting error identification program 2670 checks the VM event table 2700 and the storage setting apply state table 2980, and decides whether or not there are the same storage settings in the logical volume where the post-event VM data is stored (S4025). If the result for S4025 is No, the setting error identification program 2670 notifies the effect on the relevant VM due to the cancellation of the storage setting applied to the relevant VM by the relevant event (S4035). In S4035, the setting error identification program 2670 may give the relevant notification to the host management computer 2000 and the host management computer 2000 may have the display device 2050 output the relevant notification, or may also have the display device 2550 of the management computer 2500 output the relevant notification, or may also have both display devices output the relevant notification. A detailed description of the contents notified to the relevant VM is described later on.

If the result from S4025 is Yes, the setting error identification program 2670 checks the event effect table 2970 and the storage setting apply state table 2980, and decides whether or not the relevant post-event write data quantity satisfies the applied conditions for the relevant storage setting (S4030). If the result from S4030 is Yes, the setting error identification program 2670 ends the processing.

If the result from S4030 is No, the setting error identification program 2670 checks the VM data configuration information table 2760, the event effect table 2970, and the storage setting apply state table 2980, and checks for other VM where the relevant storage setting was applied after the relevant event (S4040).

The setting error identification program 2670 next notifies the effect on the VM where the relevant storage setting was applied due to the change in the relevant write data quantity (S4045). In S4045, the setting error identification program 2670 may give the relevant notification to the host management computer 2000 and the host management computer 2000 may display the relevant notification in the display device 2050, or may also have a display in the display device 2550 of the management computer 2500, and may also render a display on both display devices. The effect on the VM may for example be an increase or decrease in the RPO due to a change in the write data quantity occurring because there was a change in the resource allocation to the VM, and may be information on how the RPO increased over time as a result of the increased write data quantity. The write data quantity onto the logical volume is specified based on the write data quantity from the post-event VM 1001 and configuration information for the copy pair showing the target storage setting, and a command is issued for calculating the RPO of the copy pair specified in the copy configuration simulation program 2650. The detailed content of the notification of the effect on the relevant VM is described later on.

If the host management computer 2000 specifies (instructs) the change in resource allocation to the management computer 2500, the management computer 2500 may perform the processing of FIG. 16 instead of S4000 when the relevant instruction was received.

FIG. 17 is an example of a graphical user interface (GUI) that outputs the notification in S4035 by the setting error identification program 2670. In FIG. 17, an example of an output shows the case when a data migration (or movement) event in VM whose ID is VM 50 has occurred, an encryption setting is applied to the logical volume where the data for VM 50 was stored prior to movement, and the encryption setting is not applied to the logical volume for the data movement destination.

FIG. 18 is an example of a graphical user interface (GUI) that outputs a notification in S4045 by the setting error identification program 2670. In FIG. 18, an example of the output shows the case when a CPU allocation change event in the VM whose ID is VM 60 has occurred, the write data quantity of VM 60 is increasing, and also asynchronous remote copy is applied to the logical volume where the data for the VM 60 was stored.

As shown above, the management computer provided in the present embodiment is capable of giving notification of the effect rendered by the above mentioned change on providing a storage function relating to the VM, when the resource allocation of the VM was changed by the host computer.

Second Embodiment

The second embodiment is described. In the following description, the configurations differing from the first embodiment are described in particular detail, and a detailed description is omitted for the configurations that are the same as the first embodiment. In the example in the first embodiment, the setting error identification program 2670 of management computer 2500 receives a VM event from the host management computer, and gives notification of effects on the storage setting due to the relevant event. In the present embodiment, the management computer 2500 further contains a setting error correction program and an unneeded setting cancellation program. Processing to restore the storage function settings is performed based on information on the setting status of the storage function after the event identified by the setting error identification program 2670, for the case where the setting of the storage function (storage setting) applied to the VM was canceled, or the case where conditions for applying the storage settings were no longer satisfied. If the event result is that there is a logical volume whose stored VM data is gone and storage settings are not required, the relevant storage settings from the relevant logical volume are canceled.

The processing by the setting error identification program 2670 for the second embodiment is described next. The point differing from the setting error identification program 2670 of the first embodiment shown in FIG. 16 is the processing content in S4035 and S4045. In contrast to the S4035 and S4045 of the setting error identification program 2670 of the first embodiment where notification of effects on the VM due to cancellation of storage settings by an event, or applied conditions that were not satisfied was given to a display device; in S4035a and S4045a of the setting error identification program 2670 of the second embodiment notification is given to the setting error correction program of performance change information which is acquired event information or information whose application conditions were not satisfied.

Processing by the setting error correction program is described next. The setting error correction program executes processing to give notification of possibility of corrections, correction methods when corrections are possible, and effects on the VM 1001 due to correction for storage settings on the VM that were cancelled or for storage settings whose application conditions were not satisfied, based on contents reported from the setting error identification program 2670 of the management computer 2500.

Figure 19:
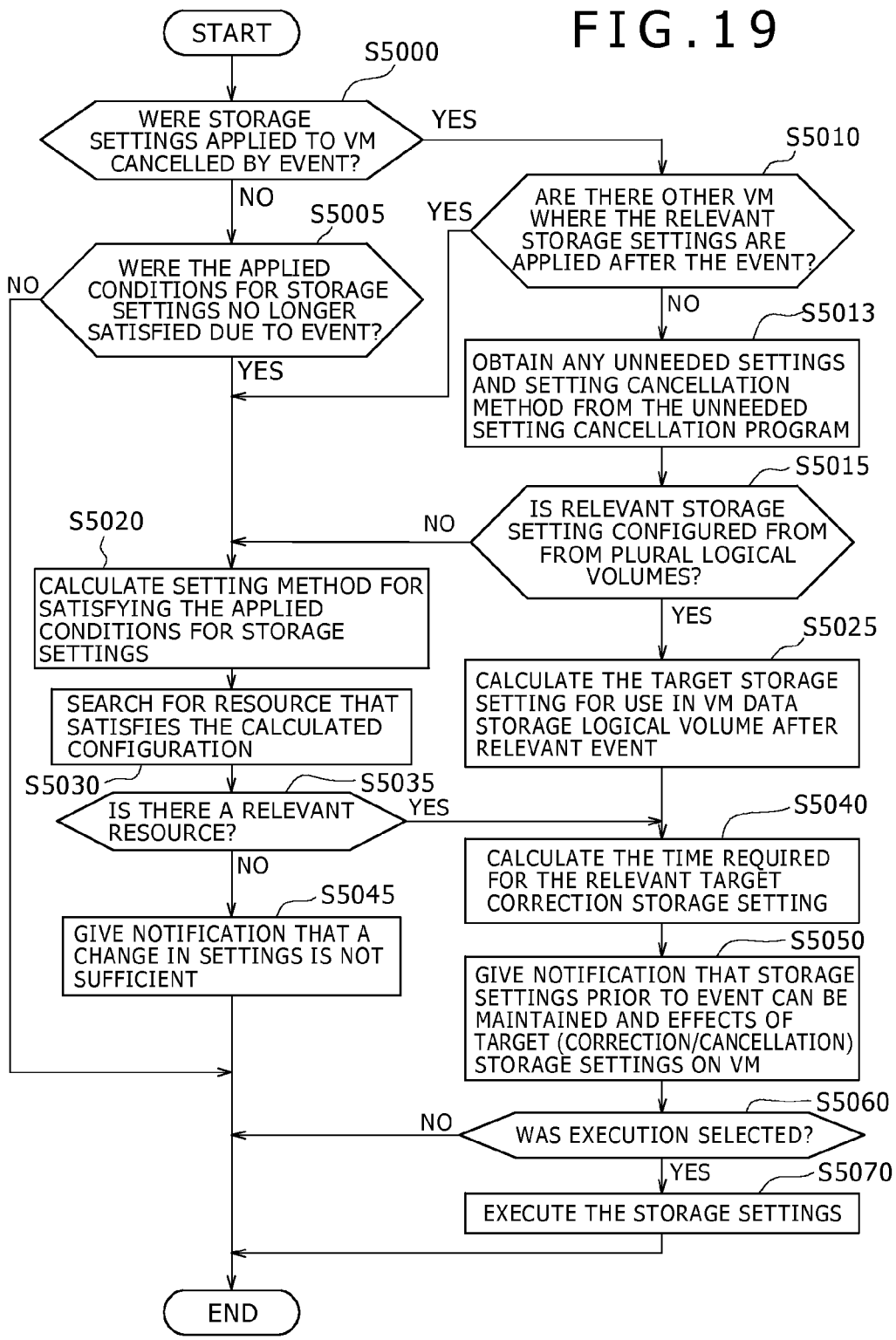
FIG. 19 is a flow chart showing the processing in the setting error correction program in the second embodiment.

FIG. 19 shows the processing by the setting error correction program. The setting error correction program first of all receives event information, cancellation/non-cancellation of storage settings due to the relevant event, or performance change information relating conditions for applying the storage settings. Next, the setting error identification program 2670 decides whether or not the storage setting applied to the VM were canceled due to the relevant event (S5000).

When the result from S5000 is No, the setting error correction program decides whether or not conditions for applying the storage settings are no longer satisfied due to the relevant event (S5005).

When the result from S5005 is No, the setting error correction program ends this process flow. When the result from S5005 is Yes, the setting error correction program calculates a setting method for resetting the relevant storage function for the VM (S5020). In S5020 when the result from S5005 was Yes, the setting error correction program specifies information with the post-event write data quantity for the event information and storage configuration information and information for the storage port catalog performance table 2710 and storage media catalog performance table 2730, VM data configuration information table 2760 and volume physical logical storage area matching table 2800, volume resource information table 2900, and external storage configuration information table 2950, and instructs the copy configuration simulation program 2650 to calculate the configuration required for implementing the specified RPO conditions, and acquires a setting method for storage functions that sets the relevant configuration as the setting parameter.

When the result from S5000 was Yes, the setting error correction program decides whether or not there is another VM where the relevant storage setting was applied after the relevant event (S5010). More specifically, a decision is made on whether or not there is other VM data in the logical volume of the data movement (or migration) source after the data migration (movement), based on the event information and the VM data configuration information table 2760.

When the result from S5010 was Yes, the setting error correction program proceeds to S5020. In S5020, when the result from S5010 was Yes, the setting error correction program instructs the copy configuration simulation program 2650 to calculate the configuration required for implementing the specified RPO conditions for the target VM, and acquires a setting method for storage functions that sets the relevant configuration as the setting parameter (S5020).

When the result from S5010 was No, the setting error correction program notifies the unneeded setting cancellation program 2690 and executes processing to acquire any unneeded settings and a setting cancellation method (S5013). The unneeded setting cancellation program is described in detail later on.

After S5013, the setting error correction program decides whether or not the relevant storage setting is comprised of plural logical volumes (S5015). A storage setting comprised of plural logical volumes is for example in cases of a configuration including an SVOL for data copy such as for remote copy settings, or a configuration including a pool 1120 such as the Thin Provisioning volume 3510C. The setting error correction program checks the volume physical logical storage area matching table 2800 and storage copy configuration information table 2960, and decides if there is a relation between the target logical volume, and other resources and logical volumes.

When the result from S5015 was No, the setting error correction program proceeds to S5020. The setting error correction program calculates a setting method for setting the storage function cancelled by the event for the logical volume at the movement (migration) destination (S5020).

After S5020, the setting error correction program checks for a resource that satisfies the configuration calculated in S5020 (S5030). The setting error correction program refers to the information in the storage port catalog performance table 2710, the storage media catalog performance table 2730, the VM data configuration information table 2760, the volume physical logical storage area matching table 2800, the volume resource information table 2900, and the external storage configuration information table 2950 and executes a check.

The setting error correction program next decides if a relevant resource was found from the check result in S5030 (S5035). When the result from S5035 was Yes, the setting error correction program proceeds to S5040 described later on. When the result from S5035 was No, the setting error correction program notifies the display device with the information that a countermeasure for a canceled storage setting or an unsatisfied condition for applying a storage setting cannot be implemented (S5045).

When the result from S5015 was Yes, the setting error correction program selects a correction storage setting to apply to the post-edit VM data storage logical volume (S5025). Storage function information set in the logical volume of the data movement source is acquired based on the volume physical logical storage area matching table 2800 and storage copy configuration information table 2960, and a storage setting with the task of serving as the logical volume of the data movement source is selected for substitution into the logical volume at the data movement destination.

In the case for example where the storage function set in the logical volume of the data movement source is an asynchronous remote copy, and the relevant logical volume was the main side of the copy pair; the main side of the copy pair is made the logical volume for the data movement destination, and the same settings as were set for the logical volume of the data movement source are utilized in the main side pool, the sub side logical volume, and the sub side pool. When newly executing storage settings by utilizing the main side pool, sub side pool, and sub side logical volume for the logical volume at the data movement destination; in contrast to the long time that was required for a setting proportional to the data quantity due to the need to copy all data within the main side logical volume into the sub side logical volume; if reutilizing a resource other than the main side logical volume, there is already data present for the target VM except for data within the buffer area in the sub side logical volume so there is no need for copying all data from the main side logical volume, and the setting time can be shortened.

After S5025, the setting error correction program calculates the time required for the correction storage setting (S5040). The management computer 2500 manages the storage setting contents and history (log) information on the time required for the storage setting, and may utilize that average value as the required time, and the management computer 2500 may calculate the required time based on the capacity of the target logical volume and the performance of the storage port.

After S5040 the setting error correction program gives notification that the storage function required for the VM is also resettable after the event, and the effect on the VM due to the storage setting (S5050). The effect on the VM due to the relevant storage setting is for example contents showing an estimate that the required time calculated in S5040 will be needed until the setting is complete, and contents showing that there is a high probability the setting will not be completed within the relevant time, when an operation for resource allocation for the VM was made during a storage setting. Also in S5050, when giving notification of the relevant effect, the setting error correction program displays a GUI on the input/output device of the management computer 2500 or the host management computer 2000 and also receives entries, in order to set whether the correction storage setting is needed or not. Moreover, when notification that storage setting is not required is obtained in S5013, that information may also be displayed, and entries specifying canceling (or not) of the relevant storage setting may also be received. The GUI is described in detail later on.

The setting error correction program next decides if a command and the necessity for making a storage setting were input or not (S5060). If result from S5060 is Yes, the setting error correction program commands the storage setting program 3340 of the storage device 3000 about the selected storage setting, and executes the setting (S5070). If result from S5060 is No, or in other words if an instruction that the setting is not needed is received or a specified time has elapsed since the instruction was input, the setting error correction program ends that process flow.

The setting error correction program allows the management computer 2500 to swiftly respond with a countermeasure when a storage setting required for the VM was canceled due to a change in resource allocation for the VM 1001. This processing is particularly effective since there is no need to consider the effects on other VM data due to setting error correction in the case of an environment where the VM 1001 data occupies one logical volume. In the case that other VM data are stored in the same logical volume, a policy change for data and data movement may be evaluated by utilizing prior technology.

Figure 20:
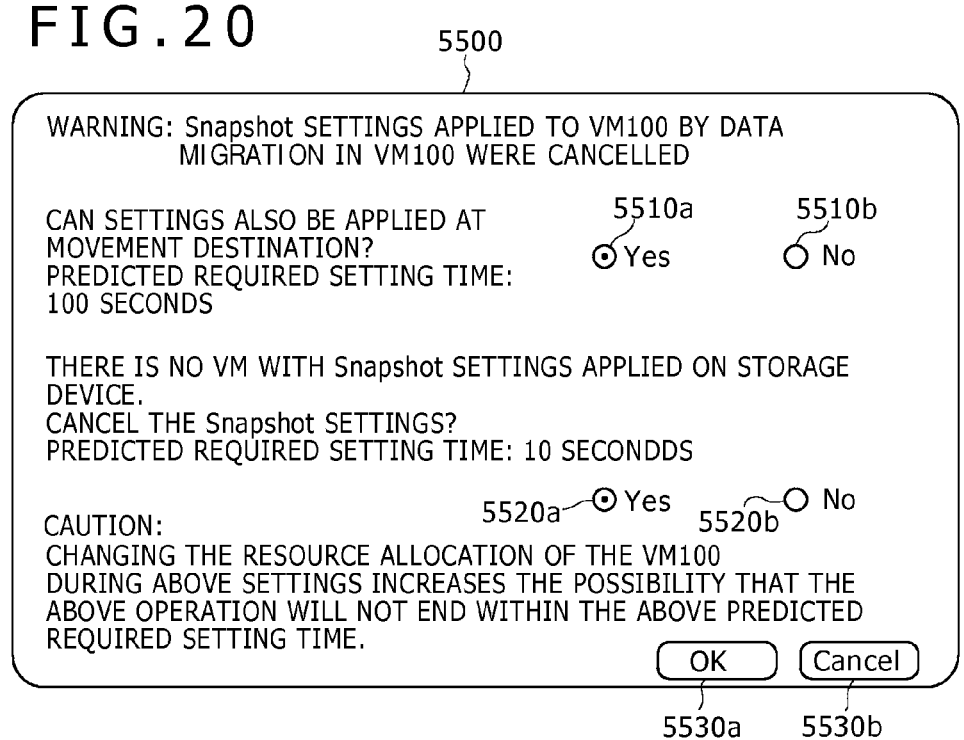
FIG. 20 is a drawing showing an example of a GUI of the second embodiment.

FIG. 20 is a drawing showing an example of the graphical user interface (GUI) for outputting notification in S5050 by the setting error correction program of the second embodiment. The setting error correction window 5500 is one example for implementing the present embodiment. The setting error correction window 5500 includes: a setting maintain decision radio button 5510, an unneeded setting cancellation decision radio button 5520, and a setting execution decision button 5530.

FIG. 20 shows an example of the output in case when a data movement event has occurred in the VM 100 whose VM ID is the VM 100, and a snapshot setting has been applied to the logical volume 3510 where the VM 100 data was stored prior to movement; further when a snapshot setting has not been applied to the logical volume 3510 for the data movement destination; and further when the VM 1001 data has not been stored in the logical volume 3510 where the VM 1001 data was stored prior to movement. Here the case is shown where the snapshot setting is made on the logical volume 3510 for the data movement destination when the maintain setting radio button 5510*a* is selected; and no snapshot setting was made on the logical volume 3510 of the data movement destination when the maintain setting radio button 5510*b* is selected. Moreover, the figure shows a setting is made to cancel the snapshot function applied to the logical volume 3510 where the VM data prior to movement is stored, when the unneeded setting cancellation decision radio button 5520*a* is selected; and the snapshot function applied to the logical volume 3510 where the VM data prior to movement is stored, is not canceled when the unneeded setting cancellation decision radio button 5520*b* is selected. The result from S5060 of the setting error correction program is decided as Yes when the setting execution decision button 5530*a* is selected; and the result from S5060 of the setting error correction program is decided as No when the setting execution decision button 5530*b* is selected. The item selected within the setting error correction window 5500 then becomes the content of the storage setting executed in S5070 of the setting error correction program.

When an instruction for changing resource allocations was received from the host management computer 2000, the management computer 2500 may accept a selection of a movement destination setting prior to data movement (migration), when the processing of FIG. 19 and the processing by the setting error identification program was executed. Moreover, the GUI for the setting maintenance decision and the GUI for the unneeded setting cancellation decision may also be displayed on separate input/output devices.

The processing by the unneeded setting cancellation program is described next. The unneeded setting cancellation program executes processing to decide if there are unneeded storage settings due to VM data that is no longer present in the logical volume, based on results from the setting error correction program of the management computer 2500, and performs processing to give notification of presence of the unneeded storage settings and cancellation method for the relevant storage setting.

Figure 21:
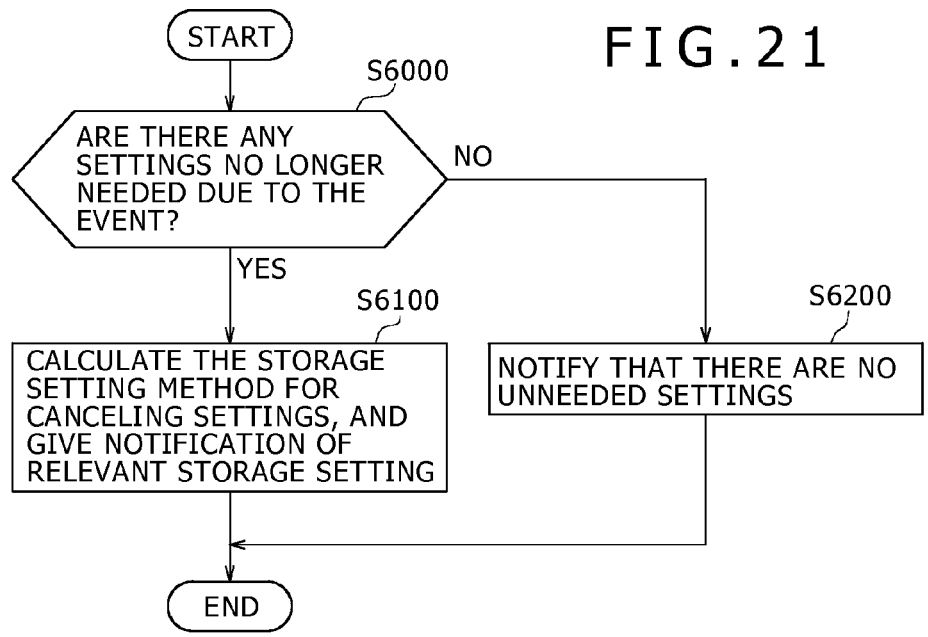
FIG. 21 is a flow chart showing the processing of the unneeded setting cancellation program of the second embodiment.

FIG. 21 is drawing showing the processing by the unneeded setting cancellation program. A decision is first of all made as to whether or not there are any storage settings that no longer need be maintained (S6000). The unneeded setting cancellation program checks the VM event table 2700, the VM data configuration information table 2760, and the storage setting apply state table 2980, and checks logical volumes where no VM data is stored and where storage functions are set.

When the result from S6000 is Yes, the unneeded setting cancellation program seeks the storage setting for cancelling the relevant storage setting, and gives notification of the relevant storage setting (S6100). If a storage setting decided unneeded in S6000 is a copy pair, the storage setting being sought is a storage setting where relevant copy pair and pool will be deleted. Information on what kind of storage setting is required for cancelling each storage setting may be prepared in advance by the management computer 2500. When the result from S6000 is No, the unneeded setting cancellation program gives notification that there are no unneeded settings (S6200).

When there is a logical volume where VM data is no longer stored as a result of VM data movement, the relevant volume can be deleted and the allocated resource may be reusable, regardless of whether there are any storage settings. The processing by the unneeded setting cancellation program allows effective utilization of the resource.

Third Embodiment

Hereafter, the configurations differing from the second embodiment are described in particular detail and a detailed description of configurations identical to the second embodiment is omitted. In S5050 through S5070 of the second embodiment, an example is shown of the setting error correction program of the management computer 2500 accepting inputs showing the decision on making the correction, and making settings based on the content of the relevant input. In the present embodiment on the other hand, in S5050 of the setting error correction program, a decision is made to execute the processing without setting a condition for receiving instructions input by the user or to execute the processing based on the accepted input, based on the status of the VM obtained by the VM/storage information acquisition program 2610, and the reason the event occurred obtained by the VM event monitor program 2640.

Compared to the first and second embodiments, the VM event table 2700 of the third embodiment also has an issue reason 2706 (not shown in drawing) showing the reason the event occurred. The issue reason 2706 may for example utilize a value such as "Maintenance" showing movement (migrating) of the VM 1001 on the host computer to a separate logical volume in order to maintain the host computer 1000; a value such as "Load balancing" showing the performing of VM data movement by the host management computer 2000 based on data movement rules managed by the host management computer 2000, in order to improve response performance of the VM 1001 and a value such as "Manual" showing there was a manual entry by the user for the host management computer 2000. The VM event monitor program 2640 acquires information on the reason causing the event to occur from the host management computer 2000, etc. and stores the information in the VM event table 2700.

The VM data configuration information table 2760 of the third embodiment further contains a VM status 2773 (not shown in drawings) showing the VM status. The VM status 2773 is for example capable of utilizing a value such as "On" showing the VM has started up, a value such as "Off" showing the VM has not started, or a value such as "Maintenance" showing maintenance status. The VM/storage information acquisition program 2610 of the third embodiment further acquires information showing the VM status and stores the information in the VM data configuration information table 2760.

Figure 22:
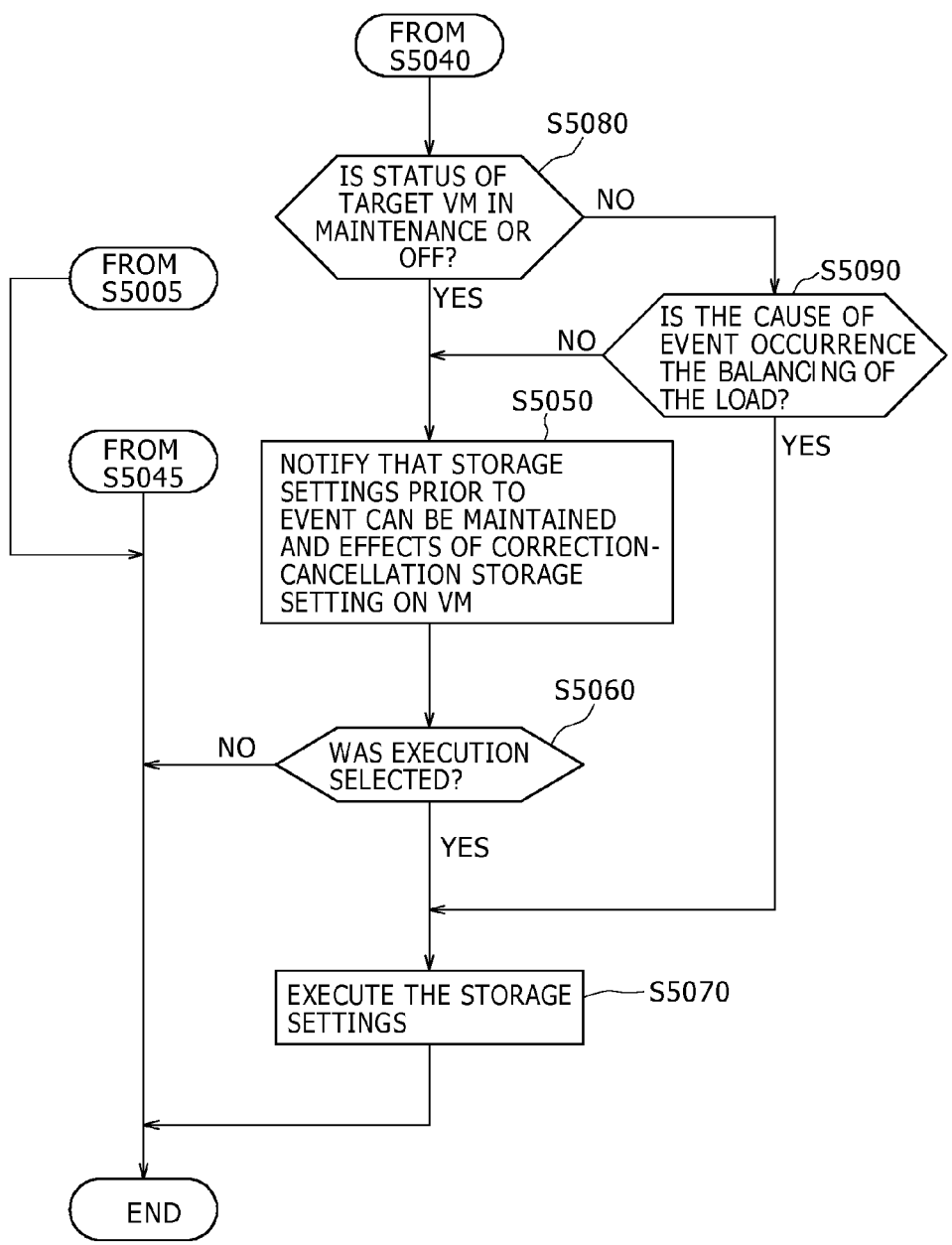
FIG. 22 is a flow chart showing the processing of setting an error correction program in the third embodiment.

FIG. 22 is a drawing showing the processing by the setting error correction program of the third embodiment. The differences versus the second embodiment are described hereafter.

After S5040, the setting error correction program decides whether the status of the target VM is maintenance or is Off (S5080). More specifically, in S5080, the setting error correction program checks the VM data configuration information table 2760, acquires the VM status 2773 for the target VM, and makes the decision. When the result from S5080 is Yes, the setting error correction program proceeds to S5050.

When the result from S5080 is No, the setting error correction program decides whether or not the reason for the target event occurring is load balancing (S5090). More specifically, in S5090, the VM event table 2700 is checked, the issue reason 2706 for the target event is acquired, and the decision is executed.

When the result from S5090 is Yes, the setting error correction program proceeds to S5070. When the result in S5090 is No, the setting error correction program proceeds to S5050.

In the processing by the setting error correction program of the third embodiment when the reason for the VM movement (migration) was load balancing, the storage settings can be made automatically without input of a user setting instruction as a condition.

In the above described embodiments, each type of function such as the setting error identification program 2670 and setting error correction program were implemented by the CPU 2510 in the management computer 2500 based on each types of programs stored in the management computer 2500, however the invention is not limited to this configuration. For example, the CPU 2510 may be mounted in another device separate from the management computer 2500 and each function may be achieved in joint operation with the relevant CPU 2510. The various programs stored in the management computer 2500 may be mounted in a device separate from the management computer 2500, and each type of function may be implemented by the CPU 2510 summoning the relevant program.

Each step in the processing by the management computer 2500 and so on need not always require chronological processing along the sequence described in the flowchart. In other words, each step in the processing by the management computer 2500 and so on may be performed in parallel even if different processing.

Hardware such as the CPU or memory within for example the management computer 2500 can be created by a computer program for exhibiting functions equivalent to each configuration for example of the above described management computer 2500, etc. A storage medium for storing that computer program may also be provided.

In environments where the host management computer 2000 executes changes in the resource allocation to the VM, each embodiment can achieve a computer system capable of utilizing functions to improve the reliability of data in the storage device 3000 or functions to control access to data, etc. Moreover, each of the embodiments will prove particularly effective in the case when there are storage function settings that cannot be managed by the host management computer 2000 due to management implemented by the management computer 2500, or in the case when the host management computer 2000 does not take into account the data copied by its own instructions during changing of the VM resource allocations.

LIST OF REFERENCE SIGNS

1000: Host computer
1001: VM (Virtual Machine)
1002: HV (Hypervisor)
2000: Host management computer
2500: Management computer
3000: Storage device
3510: Logical volume

The invention claimed is:

1. A management computer connected to a host computer and a storage device, comprising:
a memory that stores configuration information showing a plurality of logical storage areas provided by the storage device linking to an object stored in a single logical storage area among the logical storage areas and executed by a host computer, and function setting information showing a storage function set in the logical storage areas; and
a CPU connected to the memory that detects a change in the resource allocation to the first object by the host computer;
searches the structural information and the function setting information, and acquires setting information of a storage function for the first logical storage area allocated to the first object prior to the resource allocation change;
decides whether or not an effect has occurred at provision of the storage function relating to the first object due to a change in the resource allocation; and
outputs the decision results.

2. The management computer according to claim 1,
wherein the first object is a virtual machine.

3. The management computer according to claim 2,
wherein the resource allocation change includes migrating the first object data from the first logical storage area to the second logical storage area.

4. The management computer according to claim 3,
wherein when the detected resource allocation change was migrating the first object data from the first logical storage area to the second logical storage area,
the CPU decides whether or not the storage function set in the first logical storage area is set in the second logical storage area by checking the configuration information and the function setting information, and outputs the decision results when the decision is negative.

5. The management computer according to claim 4,
wherein the CPU executes a storage function setting in the second logical storage area when the decision is negative.

6. The management computer according to claim 5,
wherein the CPU decides whether or not another object is stored within the first logical storage area after migrating of the first object data, and
executes control so that the storage function setting for the first logical storage area is cancelled when another object is not stored.

7. The management computer according to claim 5,
wherein the CPU checks the configuration information, and decides whether or not another object is stored in the first logical storage area, after migrating of the first object data, and
executes control so that the third logical storage area is utilized in the storage function setting for the second logical storage area when no other object is stored, and when configured so that the storage function setting for the first logical storage area is linked to the third logical storage area.

8. The management computer according to claim 2,
wherein the resource allocation change includes a computer resource change for the host computer allocated to the first object.

9. The management computer according to claim 8,
wherein the storage function set in the first logical storage area is a remote copy function,
the memory further stores performance information for the storage device and the host computer, and
when the detected resource allocation change was a computer resource allocation change for the host computer allocated to the first object,
the CPU calculates the change in the data recovery point objective value when a problem relating to the first logical storage area has occurred due to the change in the resource allocation based on the performance information, and outputs information relating to the change in the value.

10. The management computer according to claim 8 further connected to a host management computer,
   wherein by detecting an instruction for a change in resource allocation for a host computer by a host management computer instead of detecting a change in the resource allocation for the first object by the host computer,
   the CPU checks the configuration information and performance setting information and acquires setting information for the storage function in the first logical storage area allocated to the first object prior to the resource allocation change, and
   decides whether or not an effect has occurred in the providing of a storage function relating to the first object due to a change in the resource allocation, and outputs the decision results.

11. A management method for a management computer connected to a host computer and a storage device, the method comprising:
   detecting a change in the resource allocation to the first object by the host computer;
   checking the configuration information that shows a plurality of logical storage areas provided by the storage device linked to an object stored in a single logical area among the plural logical storage areas and executed by a host computer, and function setting information that shows storage functions set in the logical storage areas, and acquiring setting information for storage functions in the first logical storage area allocated to the first object prior to the change in the resource allocation;
   deciding whether or not an effect has occurred in the providing of a storage function relating to the first object due to a change in the resource allocation; and
   outputting the decision results.

\* \* \* \* \*